(12) United States Patent
Chang et al.

(10) Patent No.: US 7,039,788 B1
(45) Date of Patent: May 2, 2006

(54) METHOD AND APPARATUS FOR SPLITTING A LOGICAL BLOCK

(75) Inventors: Robert C. Chang, Danville, CA (US); Bahman Qawami, San Jose, CA (US); Farshid Sabet-Sharghi, San Jose, CA (US)

(73) Assignee: SanDisk Corporation, Sunnyvale, CA (US)

( * ) Notice: Subject to any disclaimer, the term of this patent is extended or adjusted under 35 U.S.C. 154(b) by 254 days.

(21) Appl. No.: 10/281,631

(22) Filed: Oct. 28, 2002

(51) Int. Cl.
*G11C 16/00* (2006.01)

(52) U.S. Cl. ............... 711/203; 711/204; 711/205; 711/154; 711/155

(58) Field of Classification Search ............ 711/103, 711/154–155, 170–173
See application file for complete search history.

(56) References Cited

U.S. PATENT DOCUMENTS

| | | | | |
|---|---|---|---|---|
| 5,222,109 A | 6/1993 | Pricer | ............... | 377/24.1 |
| 5,297,148 A | 3/1994 | Harari et al. | ............... | 371/10.2 |
| 5,388,083 A | 2/1995 | Assar et al. | ............... | 365/218 |
| 5,438,573 A | 8/1995 | Mangan et al. | ............... | 371/10.3 |
| 5,568,439 A | 10/1996 | Harari | ............... | 365/218 |
| 5,598,370 A | 1/1997 | Niijima et al. | ............... | 365/185.33 |
| 5,734,816 A | 3/1998 | Niijima et al. | | |
| 5,835,935 A | 11/1998 | Estakhri et al. | ............... | 711/103 |
| 5,845,313 A | 12/1998 | Estakhri et al. | ............... | 711/103 |
| 5,860,082 A | 1/1999 | Smith et al. | ............... | 711/103 |
| 5,907,856 A | 5/1999 | Estakhri et al. | ............... | 711/103 |
| 5,924,113 A | 7/1999 | Estakhri et al. | ............... | 711/103 |
| 5,987,573 A | 11/1999 | Hiraka | | |
| 6,016,275 A | 1/2000 | Han | ............... | 365/185.29 |
| 6,081,447 A | 6/2000 | Lofgren et al. | ............... | 365/185.02 |
| 6,115,785 A | 9/2000 | Estakhri et al. | ............... | 711/103 |
| 6,125,435 A | 9/2000 | Estakhri et al. | ............... | 711/201 |
| 6,139,177 A | 10/2000 | Venkatraman et al. | | |
| 6,230,233 B1 | 5/2001 | Lofgren et al. | ............... | 711/103 |
| 6,260,156 B1 | 7/2001 | Garvin et al. | ............... | 714/8 |
| 6,381,176 B1 | 4/2002 | Kim et al. | ............... | 365/185.11 |
| 6,405,295 B1 | 6/2002 | Bando | | |
| 6,426,893 B1 | 7/2002 | Conley et al. | ............... | 365/185.11 |
| 6,684,289 B1 | 1/2004 | Gonzalez et al. | | |
| 6,807,095 B1 | 10/2004 | Chen et al. | | |

(Continued)

FOREIGN PATENT DOCUMENTS

JP 62-283496 12/1987

(Continued)

OTHER PUBLICATIONS

Kim, Jesung et al., "A Space-Efficient Flash Translation Layer for Compactflash Systems", IEEE Transactions on Consumer Electronics, vol. 48, No. 2, May 2002.

*Primary Examiner*—T Nguyen
(74) *Attorney, Agent, or Firm*—Anderson, Levine & Lintel

(57) ABSTRACT

Methods and apparatus for splitting a single logical block into two or more physical blocks are disclosed. According to one aspect of the present invention, a method for associating a plurality of physical blocks of a non-volatile memory with a logical block that includes of logical block elements involves grouping the logical block elements into at least a first logical set and a second logical set. Data associated with the first logical set is provided to a first physical block, and data associated with the second logical set is provided to a second physical block.

36 Claims, 11 Drawing Sheets

U.S. PATENT DOCUMENTS

| | | |
|---|---|---|
| 6,823,526 B1 | 11/2004 | Howard et al. |
| 6,930,193 B1 * | 8/2005 | Yaghi et al. ........... 365/250.03 |
| 2001/0010065 A1 | 7/2001 | Chiba |
| 2002/0099904 A1 | 7/2002 | Conley |

FOREIGN PATENT DOCUMENTS

| | | |
|---|---|---|
| JP | 62-283497 | 12/1987 |
| WO | WO 02/058074 A2 | 7/2002 |

* cited by examiner

METHOD AND APPARATUS FOR SPLITTING A LOGICAL BLOCK

CROSS REFERENCE TO RELATED APPLICATIONS

The present invention is related to co-pending U.S. patent application Ser. No. 10/281,739 entitled "WEAR-LEVELING IN NON-VOLATILE SYSTEMS", filed Oct. 28, 2002; co-pending U.S. patent application No. 10/281,670 entitled "TRACKING THE MOST FREQUENTLY ERASED BLOCKS IN NON-VOLATILE MEMORY SYSTEMS," filed Oct. 28, 2002; co-pending U.S. patent application Ser. No. 10/281,824 entitled "TRACKING THE LEAST FREQUENTLY ERASED BLOCKS IN NON-VOLATILE MEMORY SYSTEMS", filed Oct. 28, 2002; co-pending U.S. patent application Ser. No. 10/281,855 entitled "METHOD AND APPARATUS FOR GROUPING PAGES WITHIN A BLOCK", filed Oct. 28, 2002; co-pending U.S. patent application Ser. No. 10/281,762 entitled "METHOD AND APPARATUS FOR RESOLVING PHYSICAL BLOCKS ASSOCIATED WITH A COMMON LOGICAL BLOCK," filed Oct. 28, 2002; which are each incorporated herein by reference in their entireties.

BACKGROUND OF THE INVENTION

1. Field of Invention

The present invention relates generally to mass digital data storage systems. More particularly, the present invention relates to systems and methods for reducing the number of times a file allocation table (FAT) block associated with a flash memory is copied.

2. Description of the Related Art

The use of non-volatile memory systems such as flash memory storage systems is increasing due to the compact physical size of such memory systems, and the ability for non-volatile memory to be repetitively reprogrammed. The compact physical size of flash memory storage systems facilitates the use of such storage systems in devices which are becoming increasingly prevalent. Devices which use flash memory storage systems include, but are not limited to, digital cameras, digital camcorders, digital music players, handheld personal computers, and global positioning devices. The ability to repetitively reprogram non-volatile memory included in flash memory storage systems enables flash memory storage systems to be used and reused.

In general, flash memory storage systems may include flash memory cards and flash memory chip sets. Flash memory chip sets generally include flash memory components and a controller components. Typically, a flash memory chip set may be arranged to be assembled into an embedded system. The manufacturers of such assemblies or host systems typically acquire flash memory in component-form, as well as other components, then assemble the flash memory and the other components into a host system.

As shown in FIG. 1a, within a file system, memory 10 is effectively divided into a system or directory area 12 and a data area 14. System area 12 generally includes root directories and file allocation tables (FATs), while data files are typically included in data area 14. A file system may write data in sectors, e.g., one page at a time, into system area 12, while writing data in clusters, e.g., multiple pages at a time, into data area 14. The size of each cluster, which is generally the minimum size of a file that is associated with data area 14, may vary. For example, in an overall system which is running either a Windows or a DOS system, a cluster may be sized to include approximately four pages.

In system area 12, access is generally made to a sector or a page at a time. That is, when an update is to be made in system area 12, as for example to a FAT, substantially only one page is updated at any given time. Any updates associated with a logical block, or a block that is associated with a file system, are effectively propagated to a physical block which is mapped to the logical block. FIG. 1b is a diagrammatic representation of a mapping between a logical block and a physical block. A logical block 52 includes a plurality of pages which are each mapped to pages of a physical block 54 such that when a page associated with logical block 52 is updated, the update is written into physical block 54.

When a page is updated, a physical block which corresponds to the page is effectively recopied into a new physical block which incorporates the page, and the original physical block is erased. In general, copying the entire contents of a physical block any time a single page is to be updated within the block utilizes a relatively significant amount of overhead, and may prove to be time-consuming.

Therefore, what are desired are a method and an apparatus for efficiently enabling pages associated with system blocks to be updated. That is, what is needed is a process and a system which enables blocks within which substantially only a single page is rewritten at any given time to effectively be updated without requiring a significant use of computational resources.

SUMMARY OF THE INVENTION

The present invention relates to a system and a method for splitting a logical block into two or more physical blocks. According to one aspect of the present invention, a method for associating a plurality of physical blocks of a non-volatile memory with a logical block that includes of logical block elements involves grouping the logical block elements into at least a first logical set and a second logical set. Data associated with the first logical set is provided to a first physical block, and data associated with the second logical set is provided to a second physical block.

In one embodiment, the first physical block includes physical block elements, and the method also includes grouping the plurality of physical block elements included in the first physical block into a first physical set and a second physical set. Data associated with the first logical set may then be written into the first physical set. In such an embodiment, the method may also writing new data associated with the first logical set such that writing the updated data associated with the first logical set includes writing updated data into the second physical set.

By splitting a logical block which is generally accessed less than 4 pages at a time into a plurality of physical blocks, when an overall flash memory system is formatted, each of the physical blocks associated with the logical block is substantially only partially full, as a portion of the logical block data may be written into each of a plurality of physical blocks. When each physical block is substantially only partially full, each physical block essentially has available pages into which updates may be written. As such, the need to rewrite a full physical block into an empty physical block is reduced by the ability to write information pertaining to updates into available pages of a physical block. It is only after the available pages are all filled that the physical block may need to be rewritten. As such, by reducing the number of times physical blocks are copied into other physical blocks and erased, the performance of an overall system may be improved.

According to another aspect of the present invention, a memory device includes a first component that identifies a logical block which includes a plurality of logical elements, a second component that includes a first physical block and a second physical block, and a third component. The first physical block and the second physical block included in the second component each include a plurality of physical elements. The third component substantially divides the plurality of logical elements included in the logical block into a first logical set and a second logical set, and also writes contents associated with the first logical set into the first physical block and writes contents associated with the second logical set into the second physical block. In one embodiment, the first physical block includes a first set of physical elements of the plurality of physical elements and a second set of physical elements of the plurality of physical elements, and the third component is arranged to write contents associated with the first logical set into the first set of physical elements.

In another embodiment, the second physical block includes a first set of physical elements of the plurality of physical elements and a second set of physical elements of the plurality of physical elements, and the third component is arranged to write contents associated with the second logical set into the first set of physical elements. In such an embodiment, the third component is further writes updated contents associated with the second logical set into the second set of physical elements.

According to yet another aspect of the present invention, a method of splitting a first block, which may be a logical block, associated with a file system of a non-volatile memory system includes substantially partitioning the first block into a first portion and a second portion, associating the first portion of the first block with a second block, which may be a physical block, associated with a non-volatile memory of the non-volatile memory system, and associating the second portion of the first block with a third block associated with the non-volatile memory. When contents associated with the first portion of the first block are to be updated, the updated contents associated with the first portion are written into the second block, and when contents associated with the second portion of the first block are to be updated, the updated contents associated with the second portion are written into the third block.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which:

FIG. 2b is a diagrammatic representation a memory device, e.g., memory device 120 of FIG. 2a.

DETAILED DESCRIPTION OF THE EMBODIMENTS

Reducing the amount of overhead that is needed to store or otherwise rewrite updated pages when single pages are updated may enable an overall system, e.g., an overall host system with an embedded non-volatile memory chip, would enable the overall system to operate more efficiently. Copying an entire physical block, e.g., a block associated with a file allocation table (FAT), each time a single page associated with the physical block is to be updated may use a significant amount of overhead and, as a result, may be relatively inefficient.

By splitting a logical block such as a logical FAT block into a plurality of physical blocks, e.g., two physical blocks, when an overall flash memory system is formatted, each of the physical blocks associated with the logical block is substantially only partially full. In other words, a portion of the logical block data may be written into each of a plurality of physical blocks. By way of example, pages 0–15 of a split thirty-two page logical block may be written into pages 0–15 of a first thirty-two page physical block while pages 16–31 of the logical block may be written into pages 0–15 of a second thirty-two page physical block. When each physical block is substantially only partially full, each physical block essentially has available pages into which updates may be written.

If new pages associated with the logical blocks are to be written, the pages may be written into available pages associated with the appropriate physical block. For instance, when a new logical page in the range of logical pages 0–15 is to be written, the new logical page may be written into a first available page of pages 16–31 of the first physical block. Similarly, when a new logical page in the range of logical pages 16–31 is to be written, the new logical page may be written into a first available page of pages 16–31 of the second physical block. Until a physical block exhausts its supply of available pages, there is effectively no need to copy the contents of the physical block into a new physical block. As such, the number of copy operations associated with physical blocks may be significantly reduced, and the performance of the overall system may be improved.

Although the use of split blocks generally associates at least two physical blocks with any one logical block, since split blocks are typically implemented for blocks such as FAT blocks or blocks associated with a root directory, the number of additional physical blocks needed in a system is relatively low. The FAT blocks and root directory blocks, when implemented as split blocks, consume insignificant overhead as compared to the performance advantages which result form the use of split blocks. For example, a 128 MegaByte NAND flash chip with 64 pages per block may need only two blocks for the FATs and a root directory. Substantially only an additional two blocks may be needed for a split block implementation.

Figure 1A:
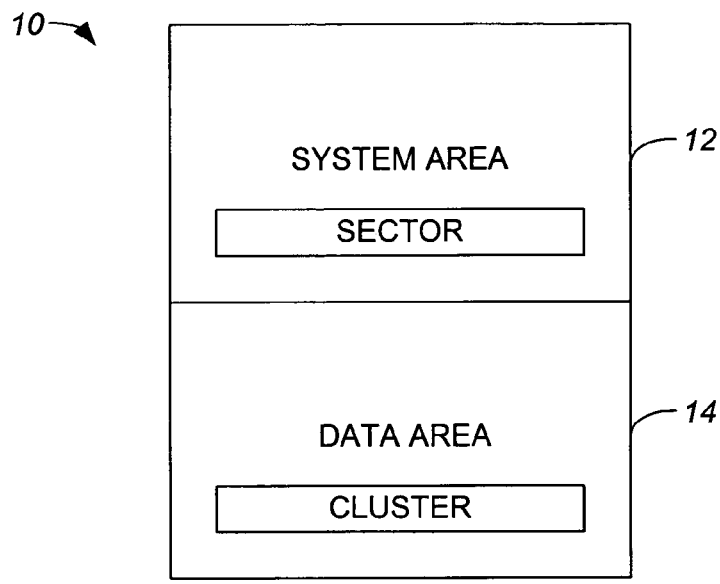
FIG. 1a is a diagrammatic representation of a memory as effectively divided by a file system.
Figure 1B:
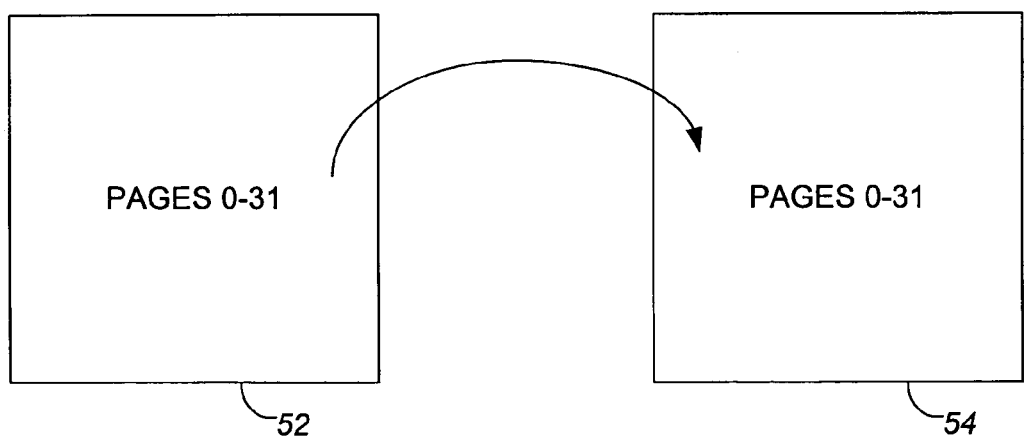
FIG. 1b is a diagrammatic representation of a mapping between a logical block and a physical block.
Figure 2A:
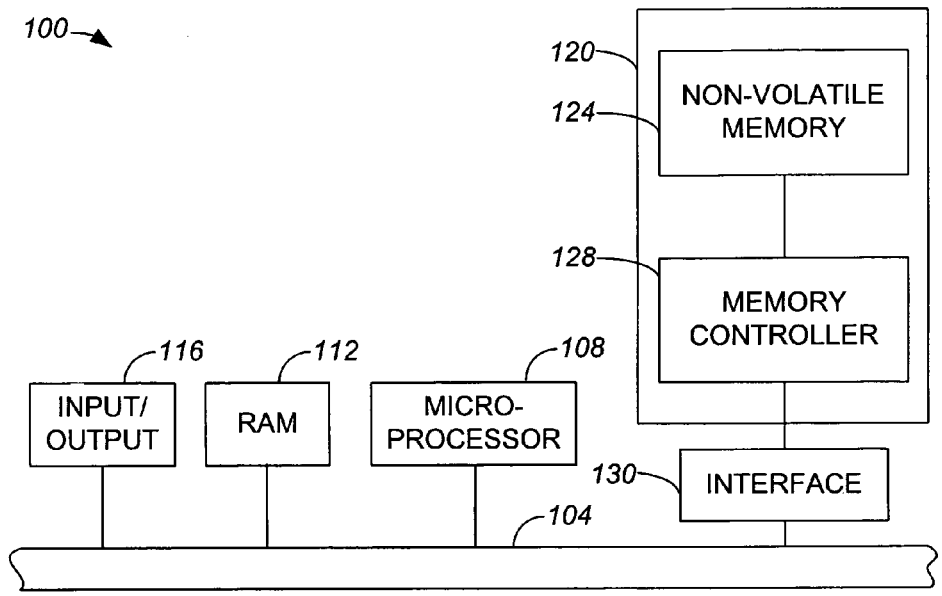
FIG. 2a is a diagrammatic representation of a general host system which includes a non-volatile memory.

Flash memory systems or, more generally, non-volatile memory devices which may benefit from the use of split blocks generally include flash memory cards and chip sets. Typically, flash memory systems are used in conjunction with a host system such that the host system may write data to or read data from the flash memory systems. However, some flash memory systems include embedded flash memory and software which executes on a host to substantially act as a controller for the embedded flash memory, as will be discussed below with respect to FIG. 2c. Referring to FIG. 2a, a general host system which includes a non-volatile memory device, e.g., a CompactFlash memory card, will be described. A host or computer system 100 generally includes a system bus 104 which allows a microprocessor 108, a random access memory (RAM) 112, and input/output circuits 116 to communicate. It should be appreciated that host system 100 may generally include other components, e.g., display devices and networking device, which are not shown for purposes of illustration.

In general, host system 100 may be capable of capturing information including, but not limited to, still image information, audio information, and video image information. Such information may be captured in real-time, and may be transmitted to host system 100 in a wireless manner. While host system 100 may be substantially any system, host system 100 is typically a system such as a digital camera, a video camera, a cellular communications device, an audio player, or a video player. It should be appreciated, however, that host system 100 may generally be substantially any system which stores data or information, and retrieves data or information.

Host system 100 may also be a system which either only captures data, or only retrieves data. That is, host system 100 may be, in one embodiment, a dedicated system which stores data, or host system 100 may be a dedicated system which reads data. By way of example, host system 100 may be a memory writer which is arranged only to write or store data. Alternatively, host system 100 may be a device such as an MP3 player which is typically arranged to read or retrieve data, and not to capture data.

A non-volatile memory device 120 which, in one embodiment, is a removable non-volatile memory device, is arranged to interface with bus 104 to store information. An optional interface block 130 may allow non-volatile memory device 120 to interface indirectly with bus 104. When present, input/output circuit block 116 serves to reduce loading on bus 104, as will be understood by those skilled in the art. Non-volatile memory device 120 includes non-volatile memory 124 and an optional memory control system 128. In one embodiment, non-volatile memory device 120 may be implemented on a single chip or a die. Alternatively, non-volatile memory device 120 may be implemented on a multi-chip module, or on multiple discrete components which may form a chip set and may be used together as non-volatile memory device 120. One embodiment of non-volatile memory device 120 will be described below in more detail with respect to FIG. 2b.

Non-volatile memory 124, e.g., flash memory such as NAND flash memory, is arranged to store data such that data may be accessed and read as needed. Data stored in non-volatile memory 124 may also be erased as appropriate, although it should be understood that some data in non-volatile memory 124 may not be erasable. The processes of storing data, reading data, and erasing data are generally controlled by memory control system 128 or, when memory control system 128 is not present, by software executed by microprocessor 108. The operation of non-volatile memory 124 may be managed such that the lifetime of non-volatile memory 124 is substantially maximized by essentially causing sections of non-volatile memory 124 to be worn out substantially equally.

Non-volatile memory device 120 has generally been described as including an optional memory control system 128, i.e., a controller. Often, non-volatile memory device 120 may include separate chips for non-volatile memory 124 and memory control system 128, i.e., controller, functions. Byway of example, while non-volatile memory devices including, but not limited to, PC cards, CompactFlash cards, MultiMedia cards, and secure digital cards include controllers which may be implemented on a separate chip, other non-volatile memory devices may not include controllers that are implemented on a separate chip. In an embodiment in which non-volatile memory device 120 does not include separate memory and controller chips, the memory and controller functions may be integrated into a single chip, as will be appreciated by those skilled in the art. Alternatively, the functionality of memory control system 128 may be provided by microprocessor 108, as for example in an embodiment in which non-volatile memory device 120 does not include memory controller 128, as discussed above.

Figure 2B:
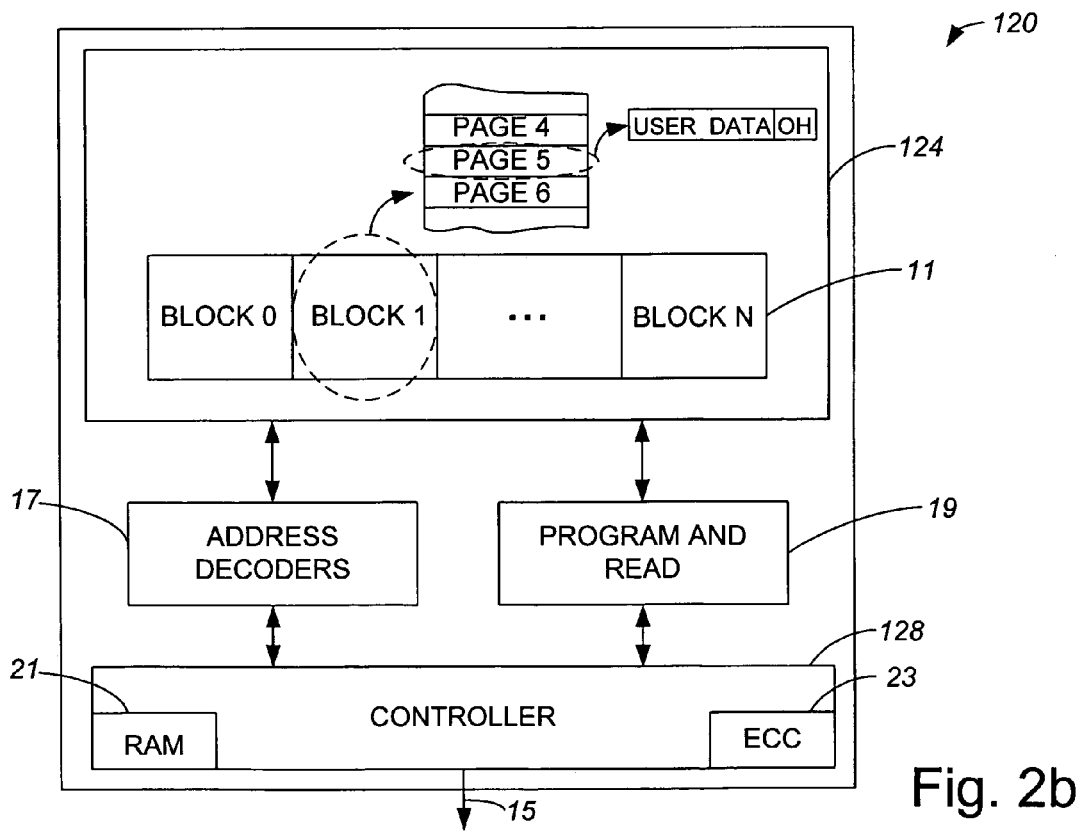

With reference to FIG. 2b, non-volatile memory device 120 will be described in more detail in accordance with an embodiment of the present invention. As described above, non-volatile memory device 120 includes non-volatile memory 124 and may include memory control system 128. Memory 124 and control system 128, or controller, may be primary components of non-volatile memory device 120, although when memory 124 is an embedded NAND device, for example, non-volatile memory device 120 may not include control system 128. Memory 124 may be an array of memory cells formed on a semiconductor substrate, wherein one or more bits of data are stored in the individual memory cells by storing one of two or more levels of charge on individual storage elements of the memory cells. A non-volatile flash electrically erasable programmable read only memory (EEPROM) is an example of a common type of memory for such systems.

When present, control system 128 communicates over a bus 15 to a host computer or other system that is using the memory system to store data. Bus 15 is generally a part of bus 104 of FIG. 2a. Control system 128 also controls operation of memory 124, which may include a memory cell array 11, to write data provided by the host, read data requested by the host and perform various housekeeping functions in operating memory 124. Control system 128 generally includes a general purpose microprocessor which has associated non-volatile software memory, various logic circuits, and the like. One or more state machines are often also included for controlling the performance of specific routines.

Memory cell array 11 is typically addressed by control system 128 or microprocessor 108 through address decoders 17. Decoders 17 apply the correct voltages to gate and bit lines of array 11 in order to program data to, read data from, or erase a group of memory cells being addressed by the control system 128. Additional circuits 19 include programming drivers that control voltages applied to elements of the array that depend upon the data being programmed into an addressed group of cells. Circuits 19 also include sense amplifiers and other circuits necessary to read data from an addressed group of memory cells. Data to be programmed into array 11, or data recently read from array 11, are typically stored in a buffer memory 21 within control system 128. Control system 128 also usually contains various registers for temporarily storing command and status data, and the like.

Array 11 is divided into a large number of BLOCKS 0–N memory cells. As is common for flash EEPROM systems, the block is typically the smallest unit of erase. That is, each block contains the minimum number of memory cells that are erased together. Each block is typically divided into a number of pages. As will be appreciated by those skilled in the art, a page may be the smallest unit of programming. That is, a basic programming operation writes data into or reads data from a minimum of one page of memory cells. One or more sectors of data are typically stored within each page. As shown in FIG. 2b, one sector includes user data and overhead data. Overhead data typically includes an error correction code (ECC) that has been calculated from the user data of the sector. A portion 23 of the control system 15 calculates the ECC when data is being programmed into array 11, and also checks the ECC when data is being read from array 11. Alternatively, the ECCs are stored in different pages, or different blocks, than the user data to which they pertain.

A sector of user data is typically 512 bytes, corresponding to the size of a sector in magnetic disk drives. Overhead data is typically an additional 16 bytes. One sector of data is most commonly included in each page but two or more sectors may instead form a page. Any number of pages may generally form a block. By way of example, a block may be formed from eight pages up to 512, 1024 or more pages. The number of blocks is chosen to provide a desired data storage capacity for the memory system. Array 11 is typically divided into a few sub-arrays (not shown), each of which contains a proportion of the blocks, which operate somewhat independently of each other in order to increase the degree of parallelism in the execution of various memory operations. An example of the use of multiple sub-arrays is described in U.S. Pat. No. 5,890,192, which is incorporated herein by reference in its entirety.

Figure 2C:
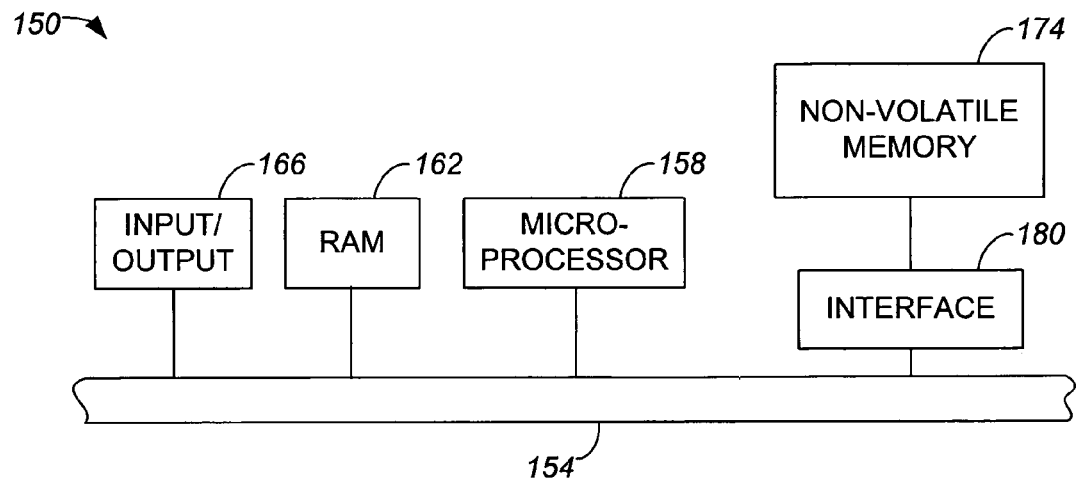
FIG. 2c is a diagrammatic representation of a host system which includes an embedded non-volatile memory.

In one embodiment, non-volatile memory is embedded into a system, e.g., a host system. FIG. 2c is a diagrammatic representation of a host system which includes an embedded non-volatile memory. A host or computer system 150 generally includes a system bus 154 which allows a microprocessor 158, a RAM 162, and input/output circuits 166, among other components (not shown) of host system 150, to communicate. A non-volatile memory 174, e.g., a flash memory, allows information to be stored within host system 150. An interface 180 may be provided between non-volatile memory 174 and bus 154 to enable information to be read from and written to non-volatile memory 174.

Non-volatile memory 174 may be managed by microprocessor 158 which effectively executes either or both software and firmware which is arranged to control non-volatile memory 174. That is, microprocessor 158 may run code devices (not shown), i.e., software code devices or firmware code devices, which allow non-volatile memory 174 to be controlled. Such code devices, which may be a flash memory packaged with CPU inside microprocessor 158, a separate flash ROM, or inside non-volatile memory 174, which will be described below, may enable physical blocks in non-volatile memory 174 to be addressed, and may enable information to be stored into, read from, and erased from the physical blocks.

Figure 3:
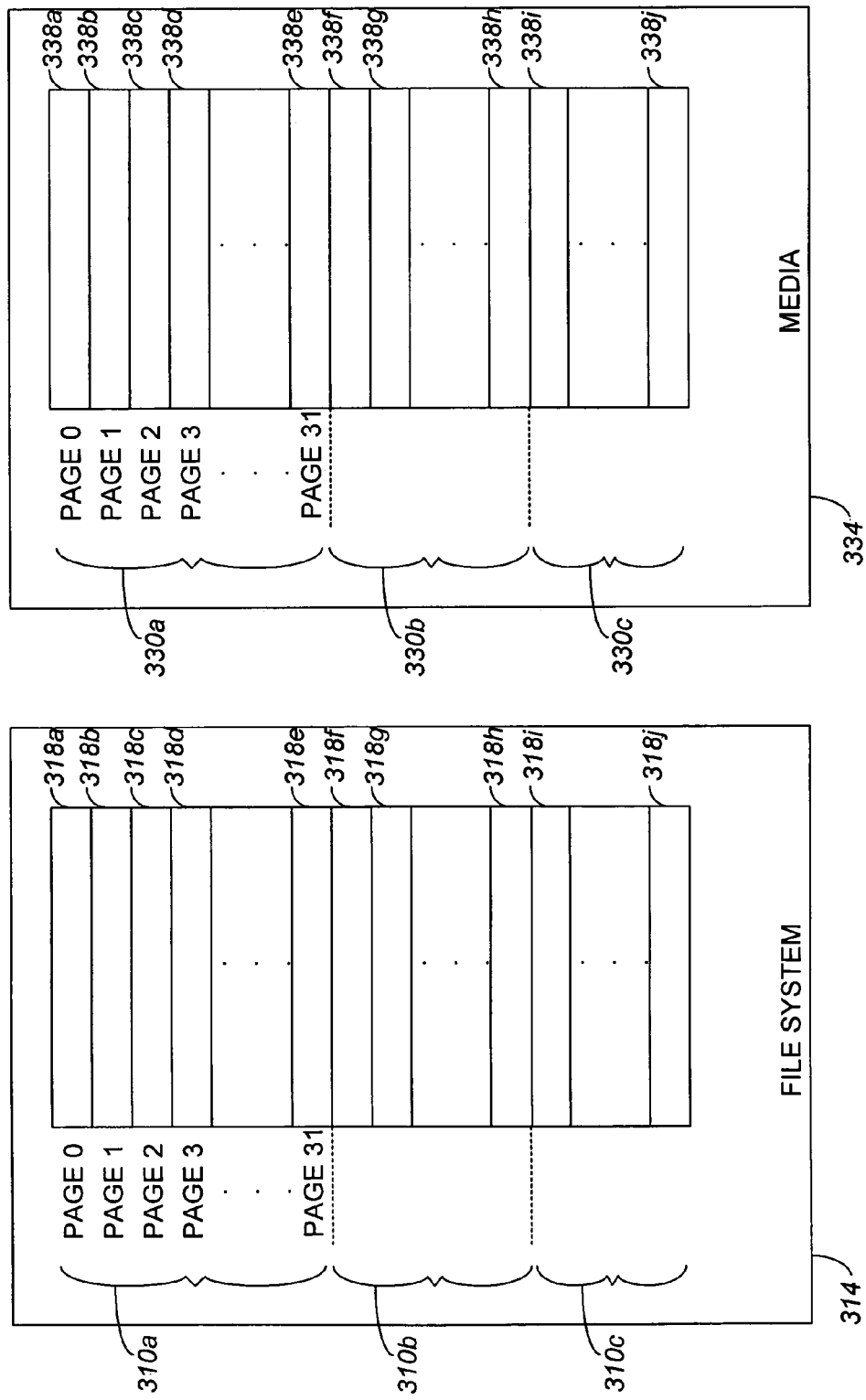
FIG. 3 is a diagrammatic representation of a file system with logical blocks and a media with physical blocks in accordance with an embodiment of the present invention.

In general, when a user writes data, the user effectively writes data to a media, as for example a flash memory card or an embedded system which includes a flash memory. The format of the data in the media is typically organized by a file system. The file system associates the data with a logical block or, more specifically, pages of a logical block, that is mapped to a physical block associated with a storage media by firmware or software associated with a controller. FIG. 3 is a diagrammatic representation of a file system with logical blocks and a media with physical blocks in accordance with an embodiment of the present invention. Logical blocks 310 of a file system 314 include any number of pages 318. The number of pages 318 included in a logical block, e.g., logical block 310a, depends on the size of an erase unit. For example, approximately thirty-two pages may be included in logical block 310a, as shown, when the smallest erase unit contains approximately thirty-two pages.

Physical blocks 330 of a media 334, e.g., an embedded flash memory, include a number of pages 338. As will be appreciated by those skilled in the art, the number of pages 338 included in physical blocks 330 is typically the same as the number of pages 318 included in logical blocks 310.

Figure 8:
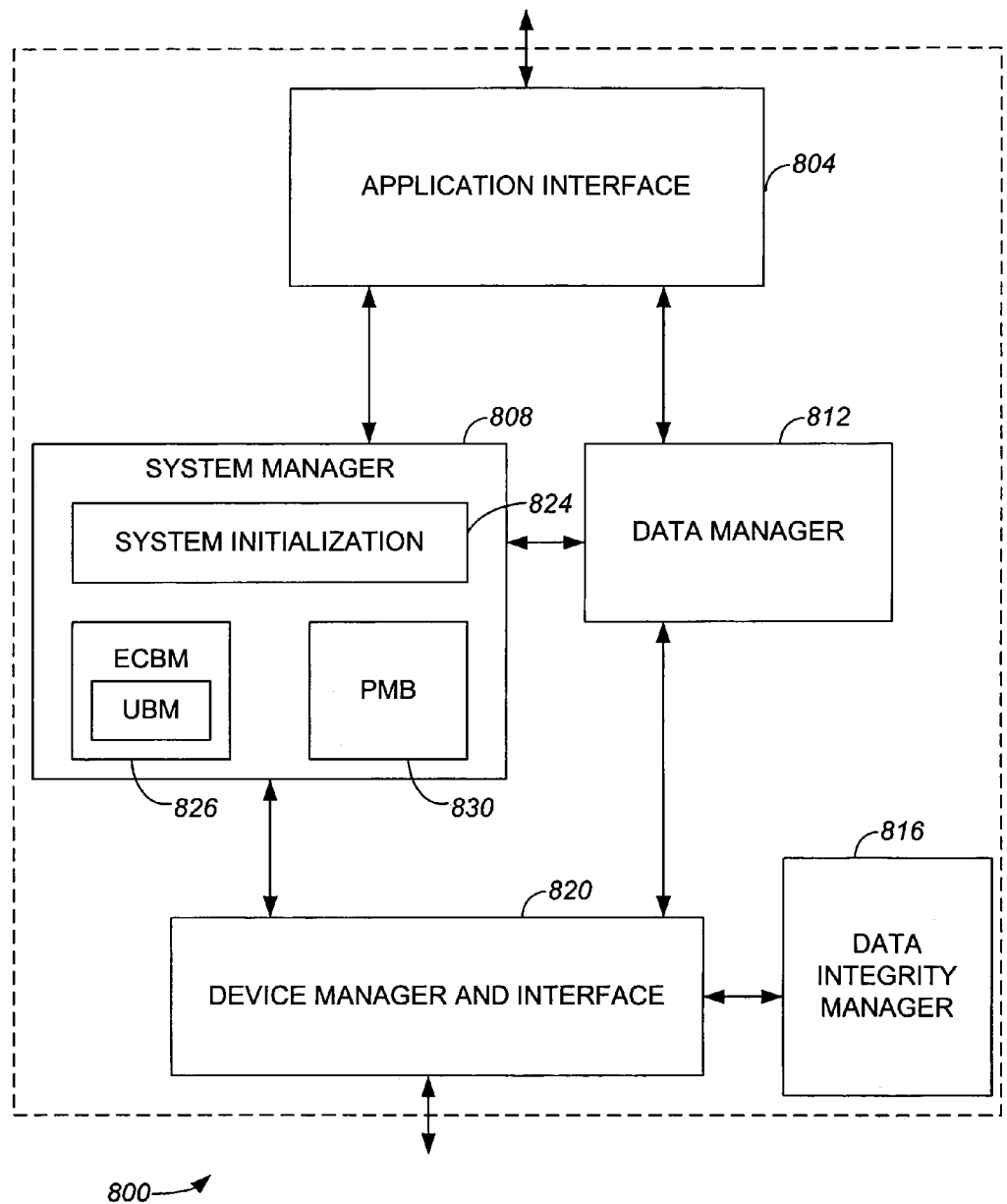
FIG. 8 is a diagrammatic block diagram representation of a system architecture in accordance with an embodiment of the present invention.

Using a data manager or data management software, as will be discussed below with respect to FIG. 8, logical blocks 310 may be mapped to physical blocks 330. Mappings between logical blocks 310 and physical blocks 330 may each be a one-to-one mapping, i.e., a mapping in which a first logical block 310 at a logical block address is mapped to a first physical block 330a at a physical block address which is substantially the same as the logical block address. However, mappings between logical blocks 310 and physical blocks 330 are often such that first logical block 310a at a logical block address is not mapped to first physical block 330a and is, instead, mapped to a different physical block, e.g., physical block 330c, which has a physical block address that is not the same as the logical block address.

Figure 4:
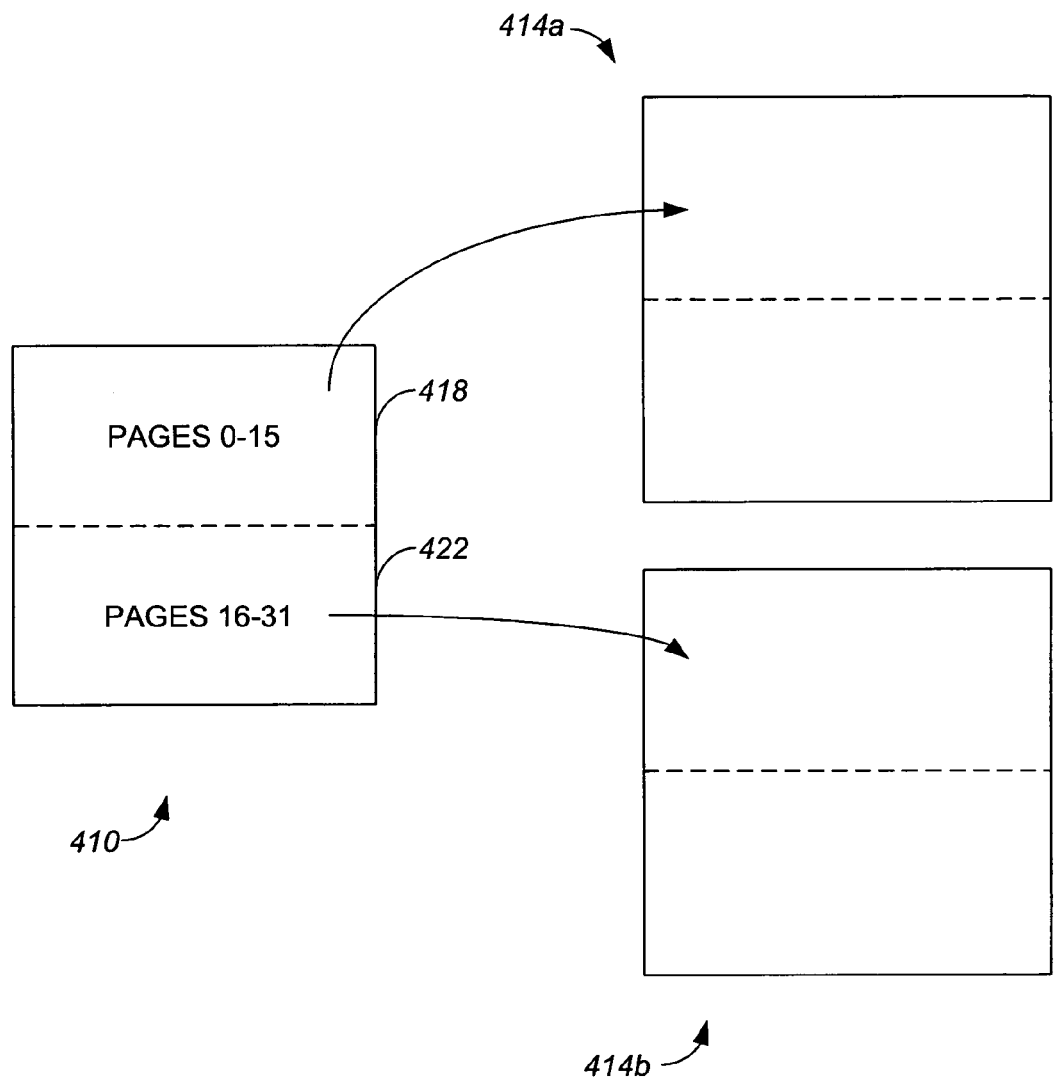
FIG. 4 is a diagrammatic representation of a mapping between a logical block and physical blocks in accordance with an embodiment of the present invention.

FIG. 4 is a diagrammatic representation of a mapping between a logical block and physical blocks in accordance with an embodiment of the present invention. A logical block 410 includes any number of pages that are effectively grouped together as a block using flash software. In the described embodiment, logical block 410 includes approximately thirty-two pages.

As will be appreciated by those skilled in the art, in addition to grouping pages into logical block 410, flash software may also generally convert or map logical blocks into physical blocks. Flash software may also split or otherwise divide logical block 410 into two physical blocks 414. While the size of physical blocks 414 may vary, the size of physical blocks 414 is generally consistent with the size of logical block 410. By way of example, when logical block 410 includes approximately thirty-two pages, physical blocks 414 each also include approximately thirty-two pages.

Splitting logical block 410 into physical blocks 414a, 414b typically occurs when an overall system which includes logical block 410 and physical blocks 414a, 414b is formatted. Typically, splitting logical block 410 may entail providing data contained in a percentage of pages associated with logical block 410 to physical block 414a and data contained in the remaining pages associated with logical block 410 to physical block 414b. By way of example, substantially half of the pages associated with logical block 410, i.e., pages 0–15 as indicated at 418, may be copied into physical block 414a, while pages 16–31 as indicated at 422 may be copied into physical block 414b. Depending on the application, it should be appreciated that a split may be performed in a variety of different ways. In one embodiment, a split may be relatively even, and may be performed such that even pages are grouped into one physical block while odd pages are grouped into another physical block. A split may also be relatively uneven, e.g., pages 0–7 may be grouped into one physical block while pages 8–31 may be grouped into another physical block if pages 0–7 are written frequently while pages 8–31 are rarely modified.

Figure 5A:
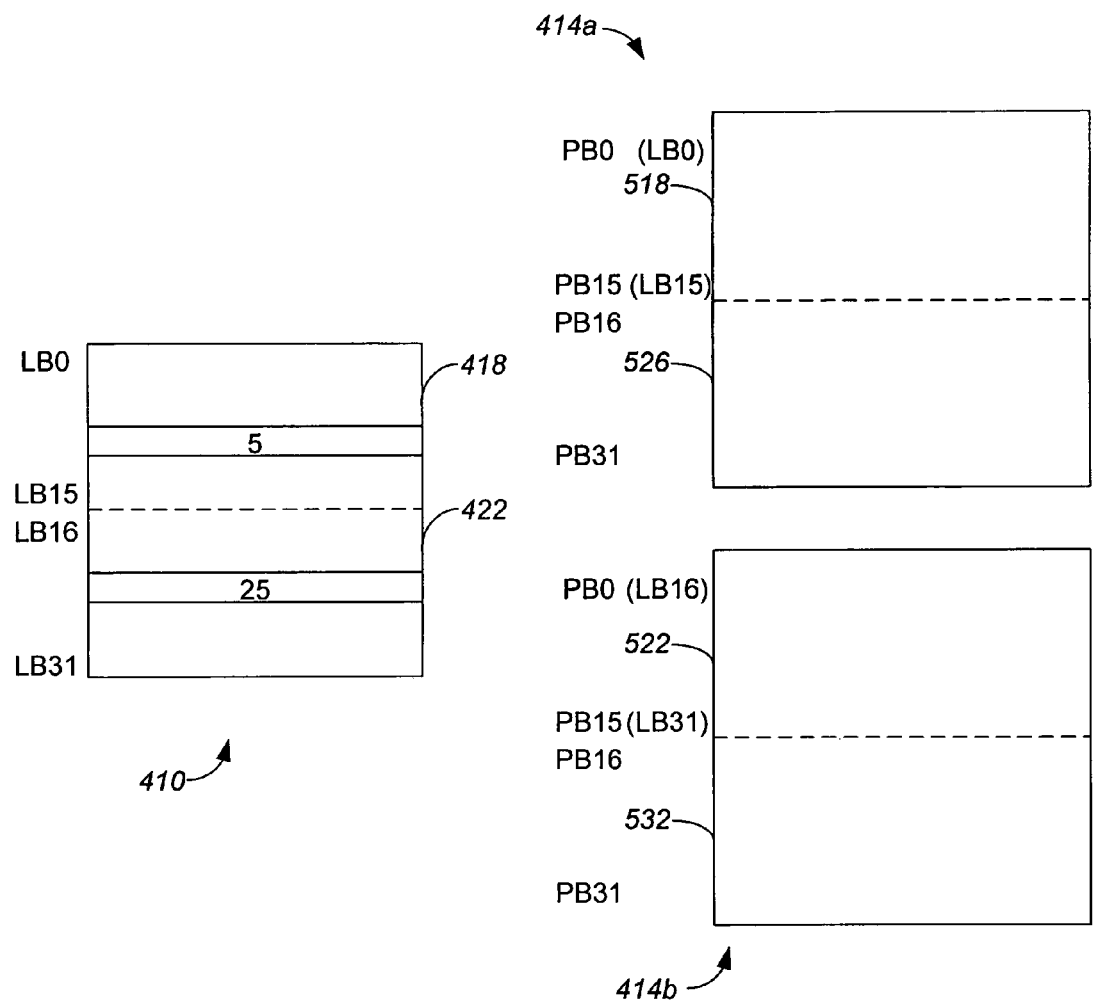
FIG. 5a is a diagrammatic representation of a mapping between a logical block and physical blocks, i.e., logical block 410 and physical blocks 414 of FIG. 4, which indicates how pages are assigned to the logical block and the physical blocks in accordance with an embodiment of the present invention.

FIG. 5a is a diagrammatic representation of a mapping between a logical block and physical blocks, i.e., logical block 410 and physical blocks 414 of FIG. 4, which indicates how pages are assigned to the logical block and the physical blocks in accordance with an embodiment of the present invention. Initially, when logical block 410 is effectively split into physical blocks 414, data associated with logical block pages 0–15 as indicated at 418 are effectively copied into physical block pages 0–15 as indicated at 518 of physical block 414a, while data associated with logical block pages 16–31 as indicated at 422 are effectively copied into physical block pages 0–15 as indicated at 522 of physical block 414b. That is, the contents of half the pages associated with logical block 410 are copied into the corresponding set of pages 518 in physical block 414a, while the contents of the other half of the pages are copied into the first half of pages 522 in physical block 414b.

When the overall system is formatted, substantially half of each physical block 414 that is associated with logical block 410 remains available, i.e., is substantially unfilled. Specifically, physical block pages 16–31 as indicated at 526 are unfilled in physical block 414a, while physical block pages 16–31 as indicated at 532 are unfilled in physical block 414b. Pages 16–31 as indicated at 526 are used to store updated contents of any of logical block pages 0–15 as indicated at 418 when updates are made. Similarly, pages 16–31 as indicated at 532 are used to store updated contents of any of logical block pages 16–31 as indicated at 422 when updates are made.

Figure 5B:
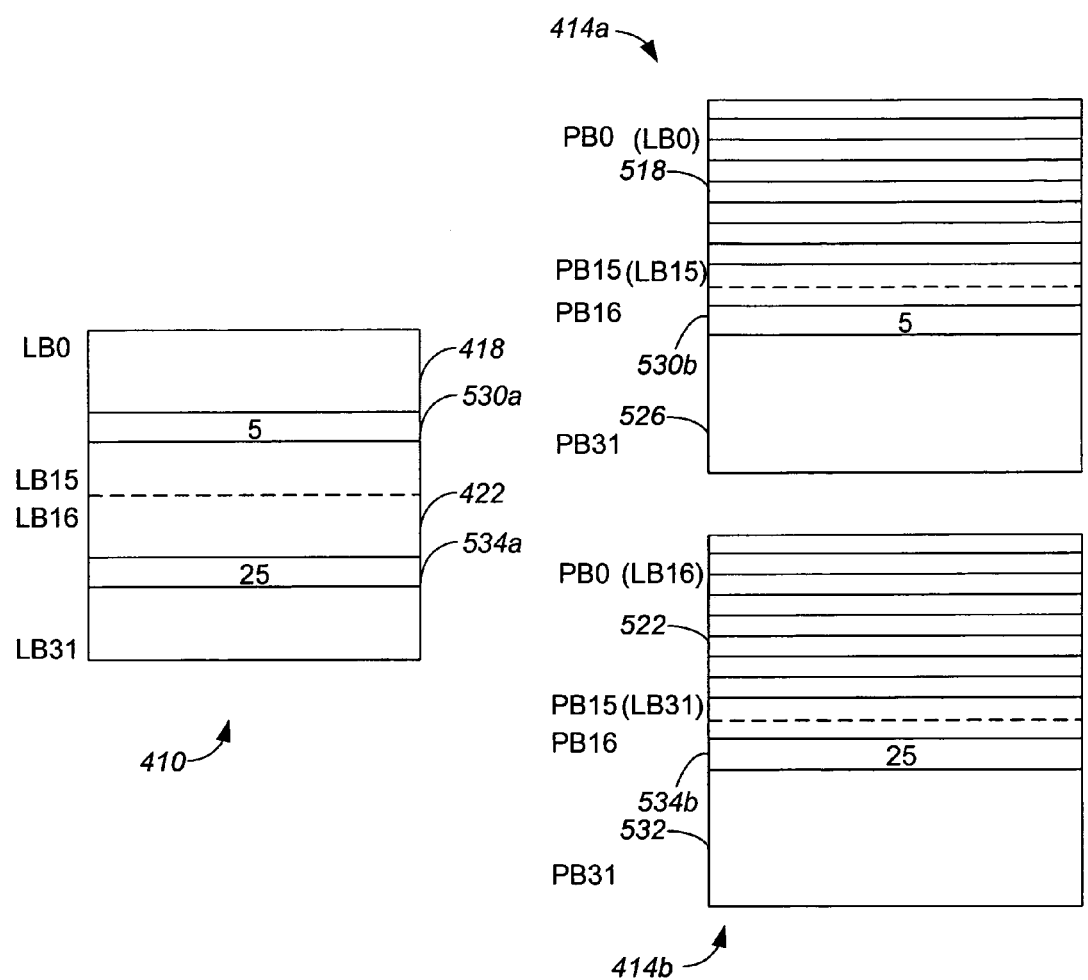
FIG. 5b is a diagrammatic block diagram representation of a system memory, i.e., the system memory of FIG. 5a, with newly written pages in accordance with an embodiment of the present invention.

As shown in FIG. 5b, when a logical block page 530a, which is part of logical block pages 0–15 as indicated at 418, is updated, the updated contents are written into a page 530b within physical block pages 16–31 as indicated at 526. That is, rather than rewrite all of physical block pages 0–15 as indicated at 518 when an update associated with logical block page 530a is made, updated logical block page 530a is instead effectively written into block 530b which, in the described embodiment, is the first available unwritten page in 414a. Similarly, when a logical block page 534a which is included in logical block pages 422 is updated, the updated contents are written into a page 534b within physical block pages 16–31 as indicated at 532.

It should be appreciated that when updated contents of a logical block page, e.g., logical block page 530a, are stored into physical block page 530b, mappings are effectively updated such that substantially any time contents associated with logical block page 530a are to be accessed, the contents of physical block page 530b are accessed. In other words, rather than accessing a page that is a part of physical block pages 0–15 as indicated at 518 when access to contents associated with logical block page 530a is desired, the most recent contents associated with logical block page 530a may be accessed at physical block page 530b. If logical block page 530a is updated again, the new contents may be stored into the next unwritten physical block page in physical block 414a. The mappings are effectively updated such that substantially any time contents associated with logical block page 530a are to be accessed, the contents of the most recently written physical block page in physical block 414a which includes contents associated with logical block paged 530a, e.g., physical block page 530b, are accessed.

In general, as long as there are available pages associated with physical blocks 414, updates associated with logical block 410 may be written into physical blocks 414 with a relatively low overhead cost, as there is effectively no need to erase a physical block 414 and copy substantially all contents associated with logical block 410 each time an update is made. However, when there are no available block pages in a physical block 414, e.g., when there are no available pages included in physical block pages 16–31 as indicated at 526, updated contents may not be copied into the physical block 414 which includes no available block pages.

Figure 5C:
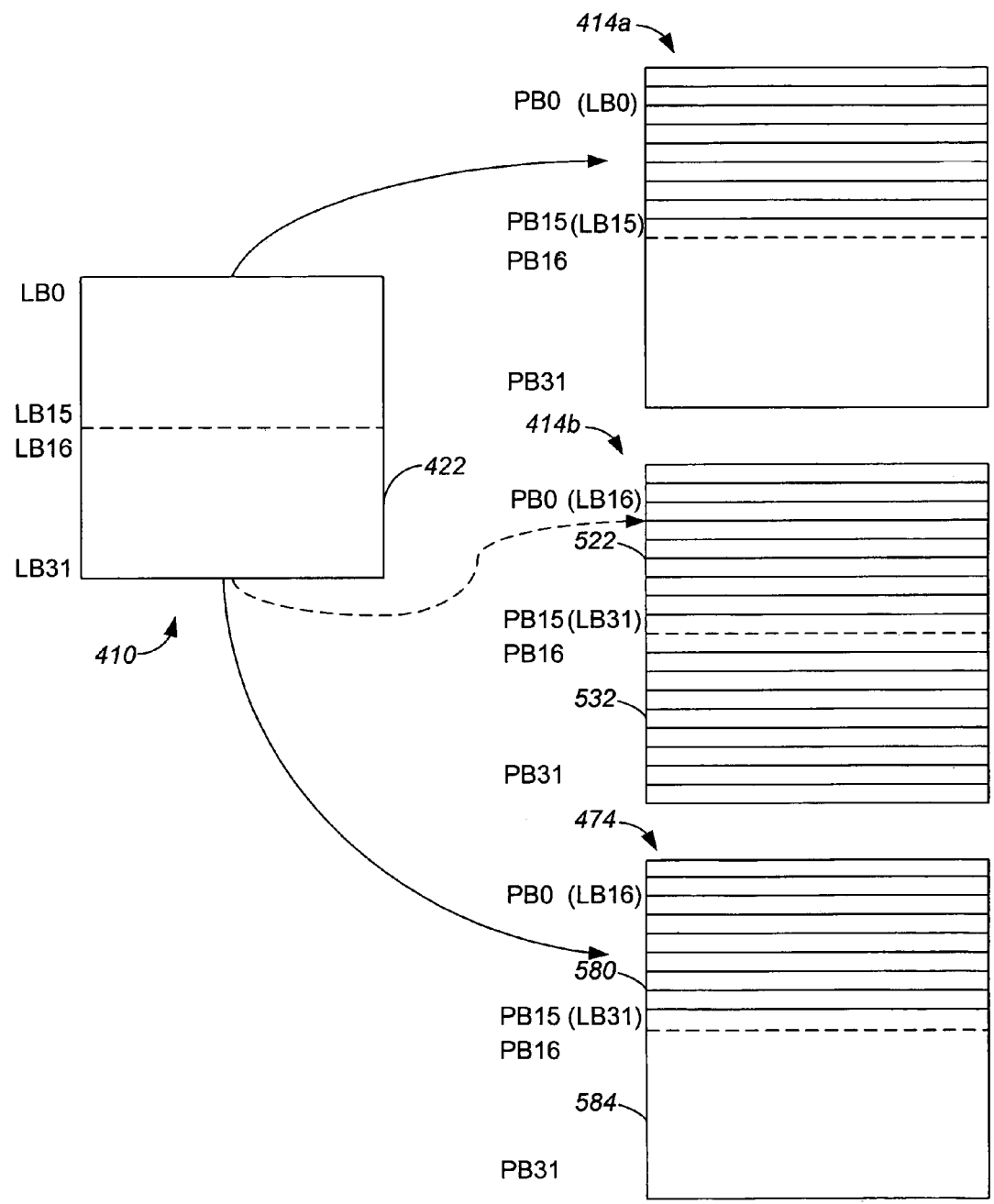
FIG. 5c is a diagrammatic block diagram representation of a system memory, i.e., the system memory of FIG. 5a, with a new physical block assigned to a split logical block in accordance with an embodiment of the present invention.

When there is effectively no space available in a physical block 414 into which updated contents may be copied, the most recent contents of the physical block 414 which has no space available may be copied into a new physical block. Referring next to FIG. 5c, effectively replacing a physical block, e.g., physical block 414b of FIGS. 5a and 5b, with a new physical block when the original physical block is substantially full will be described in accordance with an embodiment of the present invention. When physical block 414b is full such that pages 16–31 as indicated at 532 have all be written to, i.e., when substantially all available pages associated with physical block have been written to, the contents of physical block 414b which correspond to the most recent contents associated with logical blocks 16–31 as indicated at 422 may be copied into physical block pages 0–15 as indicated at 580 of a new physical block 574. As a result, pages 0–15 as indicated at 580 of physical block 574 contain the current contents associated with logical block pages 16–31 as indicated at 422, while pages 16–31 as indicated at 584 of physical block 574 remain unwritten and, hence, available.

Once contents are copied into pages 0–15 as indicated at 580, physical block 414b may be erased. Erasing physical block 414b, in addition to copying contents of physical block 414b into physical block 574, may consume relatively significant computational resources. However, since substantially no erasing and very little copying of pages generally occurs, the efficiency of a system which includes logical block 410 which is initially split into physical blocks 414 is enhanced, as an erase process on a particular physical block 414 is typically not performed until all available pages associated with the particular block have been written to. In an embodiment in which a physical blocks 414 each include approximately sixteen available pages when a system is formatted or when physical blocks 414 are initially allocated, the performance of the system with respect to updating contents associated with logical block 410 may be improved by up to approximately sixteen times. The improvement generally results from the lack of a need to copy the contents of a physical block 414, e.g., physical block 414*b*, and erase physical block 414*b* until all available pages in physical block 414*b* have been filled, i.e., until approximately sixteen updates have been made.

After contents associated with pages 16–31 as indicated at 422 are copied into physical block 574, substantially any time an update is made to contents associated with pages 16–31 as indicated at 422, an updated page may be stored into or written to one of pages 16–31 as indicated at 584. In other words, once physical block 414*b* has been erased, physical block 574 effectively takes over as a physical block which is associated with pages 16–31 as indicated at 422 of logical block 410.

As previously mentioned, a logical block which corresponds to a block of a FAT or a root directory in a FAT file system may be split to increase the performance of an overall system which includes flash memory. Although the number of physical blocks needed for FATs and a root directory within a FAT file system is effectively doubled when split blocks are used, since the number of blocks for FATs and a root directory is relatively low within an overall system, the use of additional physical blocks is relatively insignificant. However, as pages within a FAT file system are often updated, reducing the number of times a FAT block is to be copied and erased results in a significant performance advantage. It should be appreciated, however, that the use of split blocks may be beneficial in substantially any situation in which single pages are updated at any given time, e.g., in substantially any situation in which a block is typically accessed in single sectors.

Figure 6:
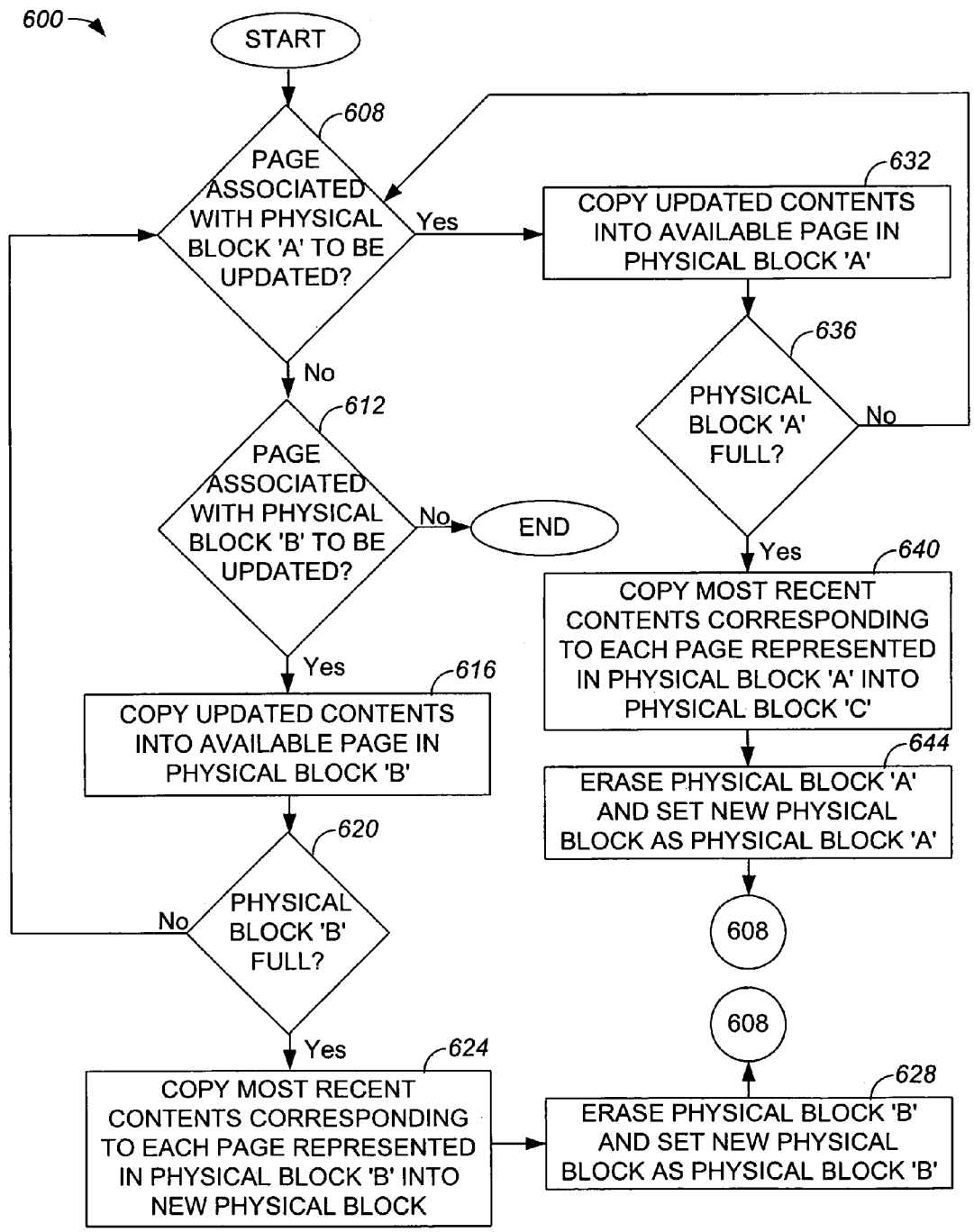
FIG. 6 is a process flow diagram which illustrates the steps associated with a first method of utilizing a split logical block in accordance with an embodiment of the present invention.

With reference to FIG. 6, one method of utilizing a split logical block will be described in accordance with an embodiment of the present invention. A logical block, as described above, is generally split or otherwise divided into two physical blocks, namely physical block 'A' and physical block 'B'. In other words, a logical block may be mapped such that some of the data associated with the logical block may be stored into physical block 'A', while essentially the rest of the data may be stored into physical block 'B'. By way of example, a logical block that is associated with thirty-two pages may be split such that sixteen of the pages are stored into physical block 'A', and sixteen of the pages are stored into physical block 'B'. Similarly, a logical block that is associated with sixty-four pages may be split such that thirty-two pages are stored in physical block 'A' and thirty-two pages are stored in physical block 'B'. It should be appreciated that after pages associated with the logical block are stored into physical block 'A' and physical block 'B', both physical block 'A' and physical block 'B' include available space, e.g., space into which updated pages may be written.

Typically, the logical block is split when an overall system which includes non-volatile memory is formatted. As previously described, split logical blocks are generally used in systems in which single sectors are updated at any given time. That is, when substantially only one page associated with a logical block is effectively updated at any one time, the use of splitting logical blocks is particularly desirable, as the number of operations associated with updating the page may be substantially minimized.

A process of utilizing a logical block 600, e.g., a process of updating a logical block, begins when a determination is made in step 608 as to whether a page that is stored in or otherwise associated with physical block 'A' is to be updated. When a sector associated with the page is to be updated, the entire page is updated, as a page is typically a minimum unit of programming. If it is determined that a page associated with physical block 'A' is not to be updated, then process flow moves to step 612 in which it is determined whether a page associated with physical block 'B' is to be updated. If it is determined that a page associated with physical block 'B' is not to be updated, then the process of updating a logical block is completed.

Alternatively, if the determination in step 612 is that a page associated with block 'B' is to be updated, then the updated contents are copied into an available page in physical block 'B'. Typically, the updated contents are copied into a first available page associated with physical block 'B'. Once the updated contents are copied, a determination is made in step 620 regarding whether physical block 'B' is full. That is, it is determined if there are additional available pages remaining in physical block 'B'.

If it is determined in step 620 that physical block 'B' is not full, then the indication is that additional updates may be made to pages associated with physical block 'B'. Accordingly, process flow returns to step 608 in which it is determined if additional updates, e.g., an update to a page associated with physical block 'A', is to be made. If the determination in step 620 is that physical block 'B' is full, then the implication is that there are no more available pages remaining in physical block 'B'. As such, in step 624, the most recent contents corresponding to each logical page represented in physical block 'B' are copied into a new physical block such that the new physical block may include the most recent contents and have available pages for future updates. Specifically, the most current information which pertains to each logical page represented in physical block 'B' is copied into a new physical block substantially in order. By way of example, if physical block 'B' includes pages sixteen through thirty-one of the split logical block, then substantially only the current contents of pages sixteen through thirty-one of the split logical block which are stored in physical block 'B' are stored into the new physical block.

Once the most recent contents are copied into the new physical block, physical block 'B' is erased in step 628, and the new physical block is effectively renamed as physical block 'B'. Then, process flow returns to step 608 in which a determination is made as to whether a page associated with physical block 'A' is to be updated.

Returning to step 608, if it is determined that a page associated with physical block 'A' is to be updated, then updated contents associated with the page that is to be updated are copied into an available page within physical block 'A'. After the contents are copied or written into the available page, a determination is made in step 636 as to whether physical block 'A' is full. If it is determined that physical block 'A' is not full, then further updates may be made to pages associated with physical block 'A'. Accordingly, process flow returns to step 608 in which it is determined whether a page associated with physical block 'A' is to be updated.

On the other hand, if it is determined in step 636 that physical block 'A' is full, then the indication is that there are effectively no available pages remaining in physical block 'A'. Therefore, the most recent contents corresponding to each logical page represented in physical block 'A' are copied into a new physical block in step 640. After the contents are copied into the new physical block, physical block 'A' is erased in step 644, while the new physical block is effectively set as physical block 'A'. In other words, the new physical block becomes known as physical block 'A'.

After the new physical block is set as physical block 'A', process flow returns to step 608 in which a determination is made regarding whether a page associated with physical block 'A' is to be updated.

Figure 7:
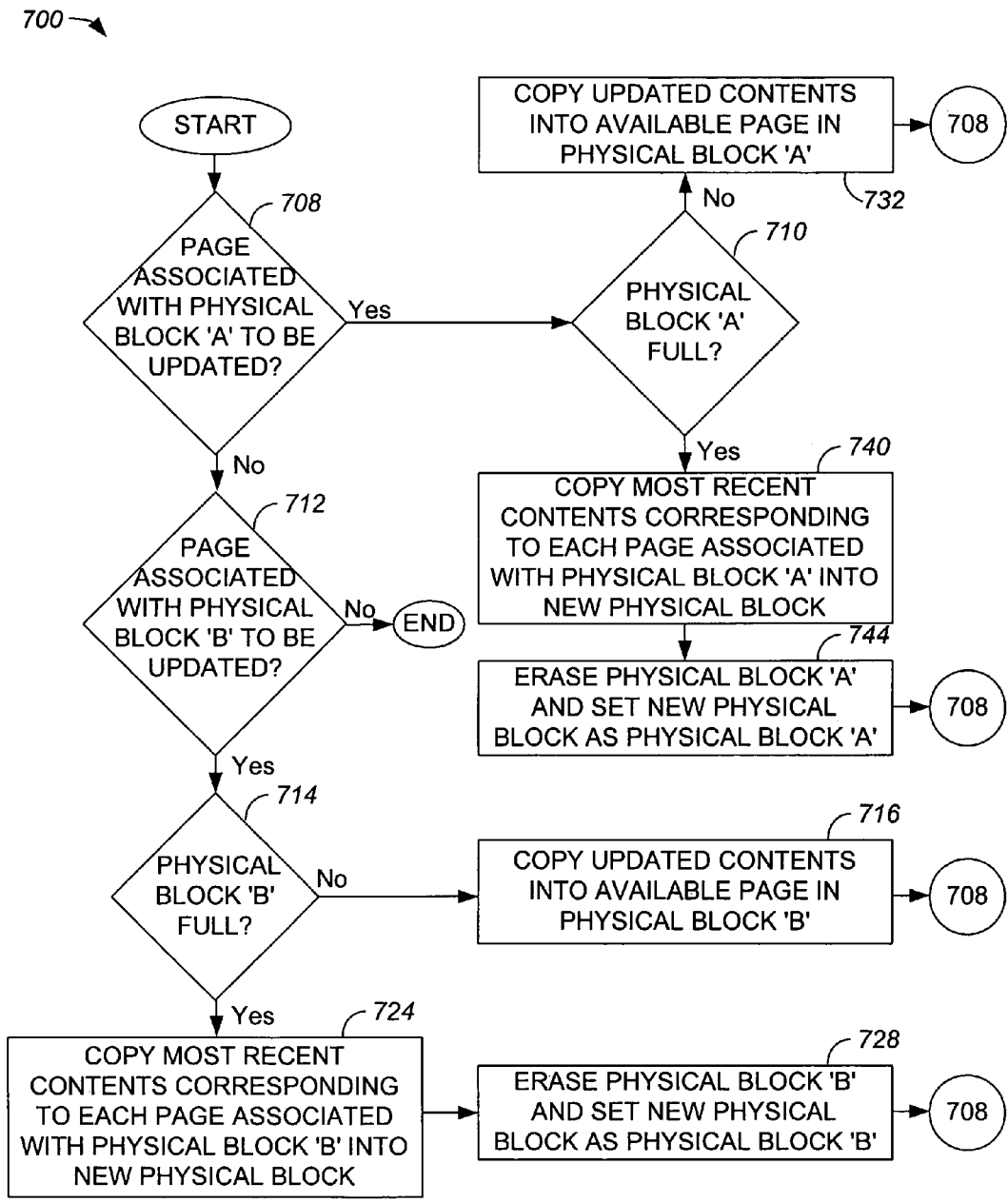
FIG. 7 is a process flow diagram which illustrates the steps associated with a second method of utilizing a split logical block in accordance with an embodiment of the present invention.

The methods of using a split logical block may vary widely. That is, a method other than the method as described with respect to FIG. 6 may be used. Another suitable method of using a split logical block will be described with reference to FIG. 7. A process 700 of utilizing, e.g., updating, a split logical block generally occurs after a logical block is split or otherwise divided into two physical blocks, namely physical block 'A' and physical block 'B'. In general, the logical block is split when an overall system which includes non-volatile memory is formatted.

After the logical block is split, process 700 begins when a determination is made in step 708 as to whether a page that is stored in or otherwise associated with physical block 'A' is to be updated. If it is determined that a page associated with physical block 'A' is not to be updated, then process flow moves to step 712 in which it is determined whether a page associated with physical block 'B' is to be updated. If it is determined that a page associated with physical block 'B' is not to be updated, then the process of updating a split logical block is completed.

Alternatively, if the determination in step 712 is that a page associated with physical block 'B' is to be updated, then a determination is made in step 714 regarding whether physical block 'B' is full, i.e., whether there is room to write updated contents into physical block 'B'. When it is determined that physical block 'B' is not full and there is room to write updated contents into physical block 'B', the updated contents are copied into an available page in physical block 'B' in step 716. Typically, the updated contents are copied into a first available page associated with physical block 'B'. Once the updated contents are copied, process flow returns to step 708 in which it is determined whether a page associated with physical block 'A' is to be updated.

Returning to step 714, if it is determined that physical block 'B' is full, and, hence, that there are essentially no additional available pages remaining in physical block 'B', then the most recent contents corresponding to each page represented in physical block 'B' are copied into a new physical block such that the new physical block may include the most recent contents and have available pages for future updates. Copying the most recent content involves copying updated contents which could not be stored into physical block 'B' because physical block 'B' was full, and the most recent contents stored in physical block 'B' that are associated with each logical page which was previously stored.

Once the most recent contents are written into the new physical block, physical block 'B' is erased in step 728, and the new physical block effectively serves the purpose of physical block 'B', e.g., the new physical block essentially becomes physical block 'B'. Then, process flow returns to step 708 in which a determination is made as to whether a page associated with physical block 'A' is to be updated.

Returning to step 708, if it is determined that a page associated with physical block 'A' is to be updated, then it is determined in step 710 whether physical block 'A' is full. If it is determined that physical block 'A' is not full, then in step 732, updated contents associated with the page that is to be updated are copied into an available page within physical block 'A'. After the contents are copied or written into the available page, process flow returns to step 708.

On the other hand, if it is determined in step 710 that physical block 'A' is full, then the implication is that further updates may not be made to pages associated with physical block 'A'. Hence, the most recent contents corresponding to each logical page which is generally represented in physical block 'A' are copied into a new physical block in step 740. Once the contents are copied into the new physical block, physical block 'A' is erased in step 744, while the new physical block is effectively set to be physical block 'A'. After the new physical block is set as physical block 'A', process flow returns to step 708 in which a determination is made regarding whether a page associated with physical block 'A' is to be updated.

In general, the functionality associated with splitting logical blocks into a plurality of physical blocks, and enabling updates to be made, is provided in software, e.g., as program code devices, or as firmware to a host system. One embodiment of a suitable system architecture associated with the software or firmware provided to a host system to enable wear leveling to occur is shown in FIG. 8. A system architecture 800 generally includes a variety of modules which may include, but are not limited to, an application interface module 804, a system manager module 808, a data manager module 812, a data integrity manager 816, and a device manager and interface module 820. In general, system architecture 800 may be implemented using software code devices or firmware which may be accessed by a processor, e.g., processor 108 of FIG. 2*a*.

In general, application interface module 804 may be arranged to communicate with the host, operating system or the user directly. Application interface module 804 is also in communication with system manager module 808 and data manager module 812. When the user wants to read, write or format a flash memory, the user sends requests to the operating system, the requests are passed to the application interface module 804. Application interface module 804 directs the requests to system manager module 808 or data manager module 812 depending on the requests.

System manager module 808 includes a system initialization submodule 824, an erase count block management submodule 826, and a power management block submodule 830. System initialization submodule 824 is generally arranged to enable an initialization request to be processed, and typically communicates with erase count block management submodule 826. Erase count block management submodule 826 includes functionality to cause erase counts of blocks to be stored, and functionality to cause an average erase count to be calculated, as well as updated, using individual erase counts. The use of erase counts is described in co-pending U.S. patent application Ser. No. 10/281,739, filed Oct. 28, 2002 which is incorporated herein by reference in its entirety. System initialization module 824 is also arranged to create a system block list, and to create a split block list, as for example for a FAT file system, which enables split blocks to be identified. Such a split block list may enable split logical blocks, as well as physical blocks which correspond to a split logical block, to be readily identified.

In addition to being in communication with application interface module 804, system manager module 808 is also in communication with data manager module 812, as well as device manager and interface module 820. Data manager module 812, which communicates with both system manager module 808 and application interface module 804, may include functionality to provide sector mapping which effectively translates logical sectors into physical sectors. That is, data manager module 812 is arranged to map logical blocks into physical blocks. Data manager module 812 may also include functionality associated with operating system and file system interface layers.

Device manager and interface module 820, which is in communication with system manager module 808, data manager 812, and data integrity manager 816, typically provides a flash memory interface, and includes functionality associated with hardware abstractions, e.g., an I/O interface. Data integrity manager module 816 provides ECC handling, among other functions.

Although only a few embodiments of the present invention have been described, it should be understood that the present invention may be embodied in many other specific forms without departing from the spirit or the scope of the present invention. By way of example, although a logical block has been described as being split into two physical blocks, a logical block may generally be split into any number of physical blocks. That is, a logical block may be split into two or more physical blocks.

When a logical block is split into a two physical blocks, the physical blocks generally each include approximately half of the contents associated with the logical block. That is, each physical block may initially be filled with half the contents associated with the logical block. It should be appreciated, however, that the contents associated with a logical block may be split relatively unevenly between physical blocks. For example, less than fifty percent of the contents associated with a logical block may be written into one physical block, while the remaining contents associated with the logical block may be written into another physical block. Relatively unevenly splitting a logical block may be beneficial in an embodiment in which it is either anticipated or observed that some pages are newly written or rewritten more often than other pages, since allowing for more available space to be included in a physical block that is associated with pages that are often written may further reduce the number of overall copy and erase operations needed.

Generally, the splitting of a logical block into a plurality of physical blocks has been described as being particularly suitable in a system area of memory in which FAT blocks and root directory blocks are stored. In other words, split blocks are typically included in a system area because blocks such as FAT blocks and root directory blocks are generally accessed in single sectors or as single pages. It should be appreciated, however, that substantially any blocks which are typically written to or updated one page at a time may become split blocks without departing from the spirit or the scope of the present invention.

The size of a flash memory and the size of blocks within the flash memory may be widely varied. While the size of blocks has generally been described as including approximately thirty-two pages, blocks may include any number of pages or, more generally, any number of elements which make up a block. For instance, a block may include approximately sixty-four pages. As a result, the number of blocks within a system may vary. Within a 512 Mb NAND flash memory, if a block includes approximately thirty-two pages which each contain approximately 512 bytes, a total of 4096 physical blocks are present in the flash memory. Alternatively, within the same 512 Mb NAND flash memory, if each physical block includes approximately sixty-four pages which each contain approximately 512 bytes, a total of 2048 physical blocks may be present in the flash memory. In general, the size of pages may also vary.

The steps associated with the various methods of the present invention may be widely varied. In general, steps may be added, removed, reordered, and altered. Therefore, the present examples are to be considered as illustrative and not restrictive, and the invention is not to be limited to the details given herein, but may be modified within the scope of the appended claims.

What is claimed is:

1. A method for associating a plurality of physical blocks of a non-volatile memory with a logical block, the logical block including a plurality of logical block elements, the method comprising:
   substantially grouping the plurality of logical block elements into sets, the sets including a first logical set and a second logical set;
   associating logical block elements of the first logical set with physical block elements of a first physical block of the plurality of physical blocks, leaving available physical block elements of the first physical block that are not associated with a logical block element;
   associating logical block elements of the second logical set with physical block elements of a second physical block of the plurality of physical blocks, leaving available physical block elements of the second physical block that are not associated with a logical block element;
   writing data associated with logical block elements of the first logical set into the associated physical block elements of the first physical block;
   writing data associated with logical block elements of the second logical set into the associated physical block elements of the second physical block; and
   then updating data associated with a first logical block element of the first logical set by:
      writing the updated data to a first available physical block element of the first physical block; and
      associating the first logical block element of the first logical set with the first available physical block element of the first physical block.

2. The method of claim 1 wherein the first logical set and the second logical set are the same size.

3. The method of claim 1 wherein the logical block is accessed one logical block element at a time.

4. The method of claim 1 wherein the logical block is associated with one of a file allocation table and a root directory.

5. The method of claim 1 wherein the logical block is associated with a file system, and the first physical block and the second physical block are associated with a flash memory.

6. The method of claim 1 wherein the logical block elements are logical pages and the physical block elements are physical pages.

7. The method of claim 1, further comprising:
   then updating data associated with a first logical block element of the second logical set by:
      writing the updated data to a first available physical block element of the second physical block; and
      associating the first logical block element of the second logical set with the first available physical block element of the second physical block.

8. The method of claim 1, further comprising:
   then again updating data associated with the first logical block element of the first logical set by:
      writing the updated data to a second available physical block element of the first physical block; and
      associating the first logical block element of the first logical set with the second available physical block element of the first physical block.

9. A method for associating a plurality of physical blocks of a non-volatile memory with a logical block, the logical block including a plurality of logical block elements, the method comprising:

grouping the plurality of logical block elements into sets, the sets including a first logical set and a second logical set;

providing data associated with the first logical set to a first physical block of the plurality of physical blocks, the first physical block including a plurality of physical block elements;

grouping the plurality of physical block elements included in the first physical block into a first physical set and a second physical set, so that the step of providing data associated with the first logical set comprises writing the data into the first physical set;

providing data associated with the second logical set to a second physical block of the plurality of physical blocks, the second physical block including a plurality of physical block elements;

grouping the plurality of physical block elements included in the second physical block into a third physical set and a fourth physical set, so that the step of providing data associated with the first logical set comprises writing the data into the third physical set;

writing new data associated with the first logical set, wherein writing the new data associated with the first logical set includes writing the new data into the second physical set;

determining when the first physical block is full; and writing at least some of the data and the new data into a third physical block when it is determined that the first physical block is full, the third physical block including a fifth physical set of physical elements and a sixth physical set of physical elements, wherein writing the at least some of the data and the new data into the third physical block includes writing the at least some of the data and the new data into the fifth physical set.

10. The method of claim 9 wherein the at least some of the data includes most recently stored data included in the data.

11. A method for associating a plurality of physical blocks of a non-volatile memory with a logical block, the logical block including a plurality of logical block elements, the method comprising:

substantially grouping the plurality of logical block elements into sets, the sets including a first logical set and a second logical set;

providing data associated with the first logical set to a first physical block of the plurality of physical blocks, the first physical block including a plurality of physical block elements;

grouping the plurality of physical block elements included in the first physical block into a first physical set and a second physical set, so that the step of providing data associated with the first logical set comprises writing the data into the first physical set;

providing data associated with the second logical set to a second physical block of the plurality of physical blocks, the second physical block including a plurality of physical block elements;

grouping the plurality of physical block elements included in the second physical block into a third physical set and a fourth physical set, so that the step of providing data associated with the first logical set comprises writing the data into the first physical set;

writing new data associated with the second logical set, wherein writing the new data associated with the second logical set includes writing the new data into the fourth physical set;

determining when the second physical block is full; and writing at least some of the data and the new data into a third physical block when it is determined that the second physical block is full, the third physical block including a fifth physical set of physical elements and a sixth physical set of physical elements, wherein writing the at least some of the data and the new data into the third physical bloc includes writing the at least some of the data and the new data into the fifth physical set.

12. A system for associating a plurality of physical blocks with a logical block, the logical block including a plurality of logical block pages, the system comprising:

a non-volatile memory, the non-volatile memory including the plurality of physical blocks;

code devices for substantially grouping the plurality of logical block pages into sets, the sets including a first logical set and a second logical set;

code devices for associating logical block pages of the first logical set with physical block pages of a first physical block of the plurality of physical blocks, leaving available physical block pages of the first physical block that are not associated with a logical block page;

code devices for associating logical block pages of the second logical set with physical block pages of a second physical block of the plurality of physical blocks, leaving available physical block pages of the second physical block that are not associated with a logical block page;

code devices for writing data associated with logical block pages of the first logical set into the associated physical block pages of the first physical block;

code devices for writing data associated with logical block pages of the second logical set into the associated physical block pages of the second physical block;

code devices for then updating data associated with a first logical block page of the first logical set by:

writing the updated data to a first available physical block page of the first physical block;

code devices for associating the first logical block page of the first logical set with the first available physical block page of the first physical block; and a memory device that stores the code devices.

13. The system of claim 12, wherein the code devices for then updating data are also for then updating data associated with a first logical block page of the second logical set by:

writing the updated data to a first available physical block page of the second physical block; and and wherein the code devices for associating are also for associating the first logical block page of the second logical set with the first available physical block page of the second physical block.

14. The system of claim 12, wherein the code devices for then updating data are also for then again updating data associated with the first logical block page of the first logical set by:

writing the updated data to a second available physical block page of the first physical block; and and wherein the code devices for associating are also for associating the first logical block page of the first logical set with the second available physical block page of the first physical block.

15. A system for associating a plurality of physical blocks with a logical block, the logical block including a plurality of logical block pages, the system comprising:
- a non-volatile memory, the non-volatile memory including the plurality of physical blocks;
- code devices for substantially grouping the plurality of logical block pages into sets, the sets including a first logical set and a second logical set;
- code devices for grouping the plurality of physical block pages included in the second physical block into a third physical set and a fourth physical set;
- code devices for providing data associated with the first logical set to a first physical block of the plurality of physical blocks, the first physical block including a plurality of physical block pages;
- code devices for grouping the plurality of physical block pages included in the first physical block into a first physical set and a second physical set, so that the code devices for providing data associated with the first logical set include code devices for writing the data into the first physical set;
- code devices for providing data associated with the second logical set to a second physical block of the plurality of physical blocks, including code devices for writing the data into the second physical set, the second physical block including a plurality of physical block pages;
- code devices for grouping the plurality of physical block pages included in the second physical block into a third physical set and a fourth physical set, so that the code devices for providing data associated with the second logical set include code devices for writing the data into the third physical set;
- code devices for writing new data associated with the first logical set, wherein the code devices for writing the new data associated with the first logical set include code devices for writing the new data into the second physical set;
- code devices for determining when the first physical block is full;
- code devices for writing at least some of the data and the new data into a third physical block when it is determined that the first physical block is full, the third physical block including a fifth physical set of physical pages and a sixth physical set of physical pages, wherein the code devices for writing the at least some of the data and the new data into the third physical block include code devices for writing the at least some of the data and the new data into the fifth physical set; and
- a memory device that stores the code devices.

16. The system of claim 15 wherein the code devices for writing at least some of the data include code devices for writing most recently stored data included in the data.

17. A system for associating a plurality of physical blocks with a logical block, the logical block including a plurality of logical block elements, the system comprising:
- a non-volatile memory, the non-volatile memory including the plurality of physical blocks;
- means for substantially grouping the plurality of logical block elements into sets, the sets including a first logical set and a second logical set;
- means for associating logical block elements of the first logical set with physical block elements of a first physical block of the plurality of physical blocks, leaving available physical block elements of the first physical block that are not associated with a logical block element;
- means for for associating logical block elements of the second logical set with physical block elements of a second physical block of the plurality of physical blocks, leaving available physical block elements of the second physical block that are not associated with a logical block element;
- means for writing data associated with logical block elements of the first logical set into the associated physical block elements of the first physical block;
- means for writing data associated with logical block elements of the second logical set into the associated physical block elements of the second physical block;
- means for then updating data associated with a first logical block element of the first logical set by:
  - writing the updated data to a first available physical block element of the first physical block; and
- means for associating the first logical block element of the first logical set with the first available physical block element of the first physical block.

18. The system of claim 17, wherein the means for then updating data is also for then updating data associated with a first logical block element of the second logical set by:
- writing the updated data to a first available physical block element of the second physical block; and
- and wherein the means for associating is also for associating the first logical block element of the second logical set with the first available physical block element of the second physical block.

19. The system of claim 17, wherein the means for then updating data is also for then again updating data associated with the first logical block element of the first logical set by:
- writing the updated data to a second available physical block element of the first physical block; and
- and wherein the means for associating is also for associating the first logical block element of the first logical set with the second available physical block element of the first physical block.

20. A system for associating a plurality of physical blocks with a logical block, the logical block including a plurality of logical block elements, the system comprising:
- a non-volatile memory, the non-volatile memory including the plurality of physical blocks;
- means for substantially grouping the plurality of logical block elements into sets, the sets including a first logical set and a second logical set;
- means for providing data associated with the first logical set to a first physical block of the plurality of physical blocks, the first physical block including a plurality of physical block elements;
- means for grouping the plurality of physical block elements included in the first physical block into a first physical set and a second physical set, so that the means for providing data associated with the first logical set comprises means for writing the data into the first physical set;
- means for providing data associated with the second logical set to a second physical block of the plurality of physical blocks, the second physical block including a plurality of physical block elements;

means for grouping the plurality of physical block elements included in the second physical block into a third physical set and a fourth physical set, so that the means for providing the data associated with the second logical set comprises means for writing the data into the third physical set;

means for writing new data associated with the first logical set, wherein the means for writing the new data associated with the first logical set include means for writing the new data into the second physical set;

means for determining when the first physical block is full; and means for writing at least some of the data and the new data into a third physical block when it is determined that the first physical block is full, the third physical block including a fifth physical set of physical elements and a sixth physical set of physical elements, wherein the code devices for writing the at least some of the data and the new data into the third physical block include code devices for writing the at least some of the data and the new data into the fifth physical set.

21. The system of claim 20 wherein the means for writing at least some of the data include means for writing most recently stored data included in the data.

22. A memory device comprising:
a first component, the first component being arranged to identify a logical block which includes a plurality of logical elements;
a second component, the second component including a first physical block and a second physical block, wherein the first physical block and the second physical block each include a plurality of physical elements; and
a third component, the third component being arranged to substantially divide the plurality of logical elements included in the logical block into a first logical set and a second logical set, the third component further being arranged to write contents associated with the first logical set into associated physical block elements of the first physical block, leaving available physical block elements of the first physical block that are not associated with a logical block element, and to write contents associated with the second logical set into associated physical block elements of the second physical block, leaving available physical block elements of the second physical block that are not associated with a logical block element;
wherein the third component is further arranged to write updated contents for a first logical element of the first logical set into a first available physical block element of the first logical set, and to then associate the first available physical block element with the first logical element of the first logical set.

23. The memory device of claim 22 wherein the plurality of logical elements are a plurality of logical pages and the plurality of physical elements are a plurality of physical pages.

24. The memory device of claim 22, wherein the third component is also for then updating data associated with a first logical block element of the second logical set by:
writing the updated data to a first available physical block element of the second physical block; and
associating the first logical block element of the second logical set with the first available physical block element of the second physical block.

25. The memory device of claim 22, wherein the third component is also for then again updating data associated with the first logical block element of the first logical set by:
writing the updated data to a second available physical block element of the first physical block; and
associating the first logical block element of the first logical set with the second available physical block element of the first physical block.

26. A memory device comprising:
a first component, the first component being arranged to identify a logical block which includes a plurality of logical elements;
a second component, the second component including a first physical block and a second physical block, the first physical block comprising a first set of physical elements and a second set of physical elements, and the second physical block comprising a plurality of physical elements;
a third component, the third component being arranged to substantially divide the plurality of logical elements included in the logical block into a first logical set and a second logical set, the third component further being arranged to write contents associated with the first logical set into the first set of physical elements of the first physical block, to write contents associated with the second logical set into the second physical block, and to write updated contents associated with the first logical set into the second set of physical elements;
wherein the third component is further arranged to determine when the first physical block is substantially full and to copy at least some of the contents and the updated contents into a third physical block when it is determined that the first physical block is substantially full.

27. The memory device of claim 26 wherein the third component is still further arranged to erase the first physical block.

28. The memory device of claim 26 wherein the third physical block includes a third set of physical elements and a fourth set of physical elements, and wherein the at least some of the contents and the updated contents are copied into the third set of physical elements.

29. A method of splitting a first block associated with a file system of a non-volatile memory system, the method comprising:
partitioning the first block into a first portion and a second portion;
associating the first portion of the first block with a second block of a non-volatile memory of the non-volatile memory system;
associating the second portion of the first block with a third block of the non-volatile memory;
writing contents associated with the first portion of the first block into a first area of the second block, wherein the second block includes the first area and a second area; and
then updating previously written contents associated with the first portion by writing updated contents into the second area of the second block.

30. The method of claim 29 wherein partitioning the first block into the first portion and the second portion includes evenly partitioning the first block into the first portion and the second portion.

31. The method of claim 30, further comprising:
writing contents associated with the second portion of the first block into a first area of the third block, wherein the third block includes the first area and a second area.

32. The method of claim 30 wherein the first block, the second block, and the third block are substantially the same size.

33. The method of claim 30 wherein the first block has an associated number of pages, the second block has the associated number of pages, and the third block has the associated number of pages.

34. The method of claim 30 wherein the first block is a logical block, the second block is a physical block, and the third block is a physical block.

35. The method of claim 31, further comprising:
updating previously written contents associated with the first portion by writing updated contents into the second area of the third block.

36. A method of splitting a first block associated with a file system of a non-volatile memory system, the method comprising:
evenly partitioning the first block into a first portion and a second portion;
associating the first portion of the first block with a second block associated with a non-volatile memory of the non-volatile memory system, by writing contents associated with the first portion of the first block into a first area of the second block, wherein the second block includes the first area and a second area;
associating the second portion of the first block with a third block associated with the non-volatile memory, wherein when contents associated with the first portion of the first block are to be updated, the updated contents associated with the first portion are written into the second area of the second block, and wherein when contents associated with the second portion of the first block are to be updated, the updated contents associated with the second portion are written into the third block;
determining when the second area of the second block is substantially full; and
writing the contents and the updated contents associated with the first portion of the first block into a first part of a fourth block, the fourth block being arranged to include the first part and a second part.

* * * * *